US012530905B2

United States Patent
Lee et al.

(10) Patent No.: US 12,530,905 B2
(45) Date of Patent: Jan. 20, 2026

(54) METHOD FOR MANAGING DRIVING AND ELECTRONIC DEVICE

(71) Applicant: HON HAI PRECISION INDUSTRY CO., LTD., New Taipei (TW)

(72) Inventors: Chieh Lee, New Taipei (TW); Jung-Hao Yang, New Taipei (TW); Shih-Chao Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 476 days.

(21) Appl. No.: 18/096,480

(22) Filed: Jan. 12, 2023

(65) Prior Publication Data
US 2023/0419682 A1 Dec. 28, 2023

(30) Foreign Application Priority Data

Jun. 22, 2022 (CN) .......................... 202210714369.3

(51) Int. Cl.
*G06V 20/58* (2022.01)
*G06T 7/11* (2017.01)
(Continued)

(52) U.S. Cl.
CPC ................ *G06V 20/58* (2022.01); *G06T 7/11* (2017.01); *G06T 7/55* (2017.01); *G06T 7/70* (2017.01); *G06V 10/25* (2022.01); *G06V 10/267* (2022.01); *G06V 10/774* (2022.01); *G06V 10/776* (2022.01); *G06V 10/82* (2022.01);
(Continued)

(58) Field of Classification Search
CPC ...... G06V 20/58; G06V 10/25; G06V 10/267; G06V 10/774; G06V 10/776; G06V 2201/07; G06T 7/55; G06T 7/11; G06T 7/70; G06T 2207/10024; G06T 2207/10028; G06T 2207/20081; G06T 2207/20084; G06T 2207/30244; G06T 2207/30261
See application file for complete search history.

(56) References Cited

U.S. PATENT DOCUMENTS 10,937,178 B1 * 3/2021 Srinivasan ............... G06T 7/521
2019/0362512 A1 * 11/2019 Plowman ............... G06V 20/58
(Continued)

FOREIGN PATENT DOCUMENTS

JP          2009271766 A  * 11/2009

*Primary Examiner* — Utpal D Shah
*Assistant Examiner* — Jack Peter Kraynak
(74) *Attorney, Agent, or Firm* — ScienBiziP, P.C.

(57) ABSTRACT

A method for managing driving applied in an electronic device which assesses distances to objects in a path of autonomous driving obtains RGB images of a scene in front of a vehicle, processes the RGB images based on a trained depth estimation model, and obtain depth images corresponding to the RGB images. The depth images are converted to 3D point cloud maps, 3D regions of interest from the 3D point cloud maps are determined according to a size of the vehicle, and the 3D regions of interest are converted into 2D regions of interest according to internal parameters of a camera. The 2D regions of interest are analyzed for obstacles. Driving continues when the 2D regions of interest have no obstacles, the vehicle is controlled to issue an alarm when obstacles are discovered.

18 Claims, 4 Drawing Sheets

(51) Int. Cl.
  *G06T 7/55* (2017.01)
  *G06T 7/70* (2017.01)
  *G06V 10/25* (2022.01)
  *G06V 10/26* (2022.01)
  *G06V 10/774* (2022.01)
  *G06V 10/776* (2022.01)
  *G06V 10/82* (2022.01)

(52) U.S. Cl.
  CPC .............. *G06T 2207/10024* (2013.01); *G06T 2207/10028* (2013.01); *G06T 2207/20081* (2013.01); *G06T 2207/20084* (2013.01); *G06T 2207/30244* (2013.01); *G06T 2207/30261* (2013.01); *G06V 2201/07* (2022.01)

(56) References Cited

U.S. PATENT DOCUMENTS

| | | | |
|---|---|---|---|
| 2021/0118184 A1* | 4/2021 | Pillai | G06N 3/088 |
| 2021/0397855 A1* | 12/2021 | Guizilini | G06T 7/50 |
| 2022/0057806 A1* | 2/2022 | Guo | G06T 7/97 |
| 2022/0068017 A1* | 3/2022 | Lee | G06T 7/593 |
| 2022/0092291 A1* | 3/2022 | Lai | G01S 17/42 |
| 2022/0188554 A1* | 6/2022 | Huang | G01S 13/931 |
| 2022/0256082 A1* | 8/2022 | Namba | G01C 21/3602 |
| 2022/0301202 A1* | 9/2022 | Park | G06N 3/04 |
| 2023/0033177 A1* | 2/2023 | Goel | G06V 20/58 |

* cited by examiner

METHOD FOR MANAGING DRIVING AND ELECTRONIC DEVICE

This application claims priority to Chinese Patent Application No. 202210714369.3 filed on Jun. 22, 2022, in China National Intellectual Property Administration, the contents of which are incorporated by reference herein.

FIELD

The subject matter herein generally relates to an autonomous driving, in particular, relates to a method for managing safer driving and an electronic device.

BACKGROUND

In a field of autonomous driving, a moving vehicle must detect whether there are obstacles on the way of the vehicle, and if there are obstacles, safety measures will be activated, such as emergency braking or issuing an alarm, to ensure the driving safety of the vehicle. However, when detecting obstacles, the vehicle cannot accurately know how far away obstacles may be, resulting in unsafe driving and poor driving experience for users.

BRIEF DESCRIPTION OF THE DRAWINGS

Implementations of the present disclosure will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Figure 1:
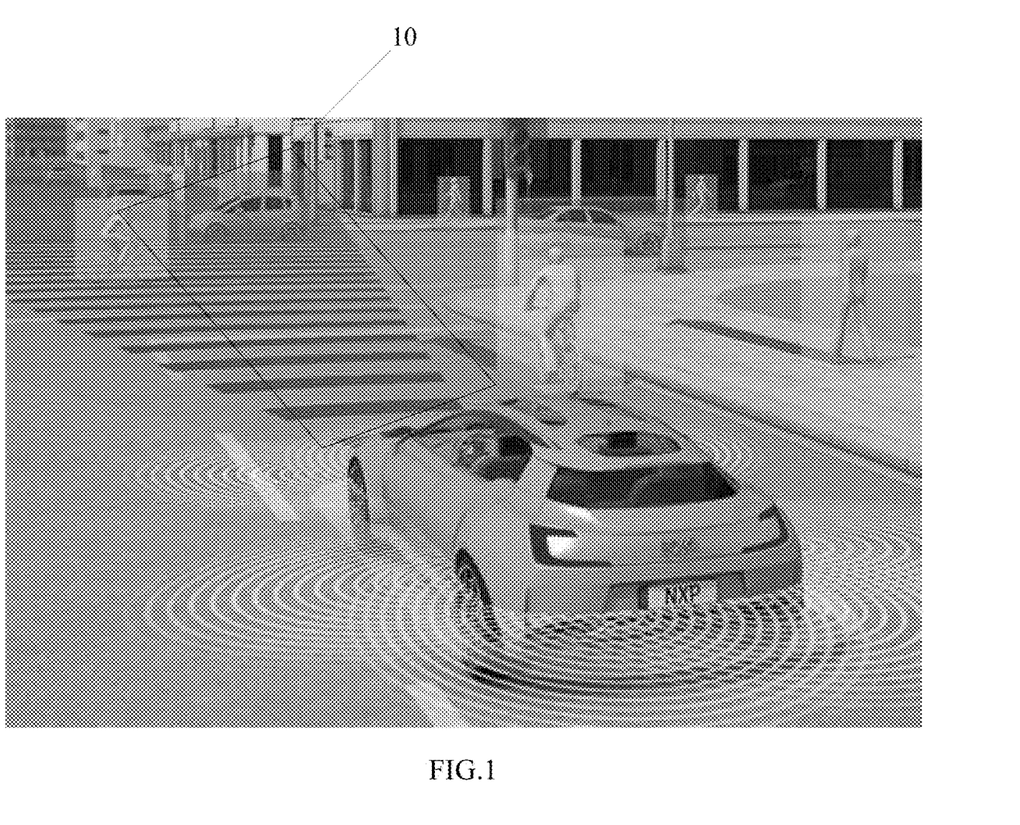
FIG. 1 is an application scene diagram of a method for managing driving in an embodiment of the present disclosure.

FIG. 1 illustrates an application scene of the method. The method is applied in a field of automatic driving. A Two-Dimensional (3D) box in an image shown in FIG. 1 is a 2D region of interest 10 in which the vehicle is driving in a straight line. Only objects in the 2D region of interest 10 will be determined as obstacles, and other regions of the image will not be considered.

Figure 2:
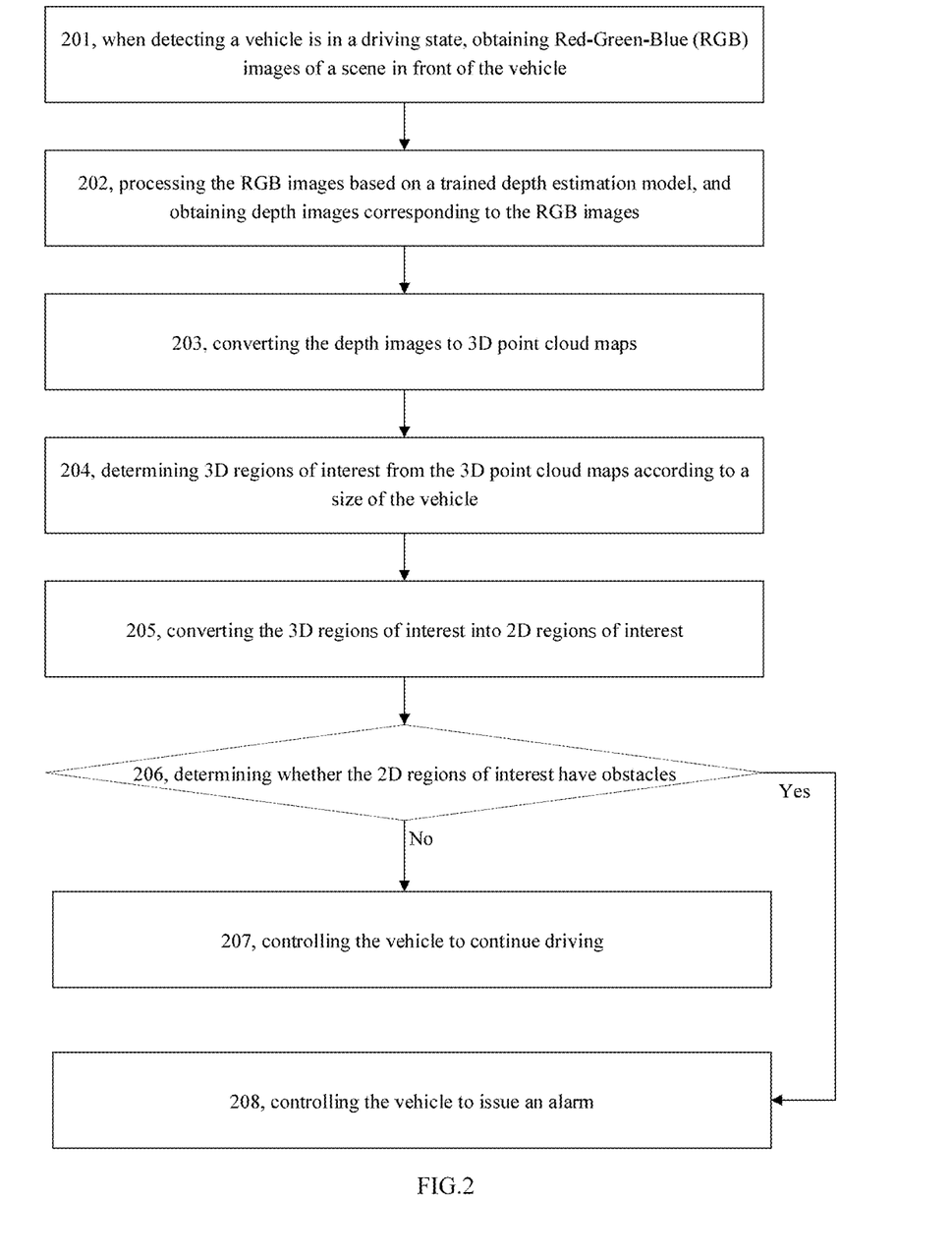
FIG. 2 is a flowchart of one embodiment of the method of FIG. 1.

FIG. 2 illustrates the method for managing driving. The method can be applied to a vehicle, and for the vehicle that needs driving assistance, the function for assisting driving provided by the method of the present application can be directly integrated on the vehicle, or the method can run on the vehicle in the form of a Software Development Kit (SDK).

Figure 4:
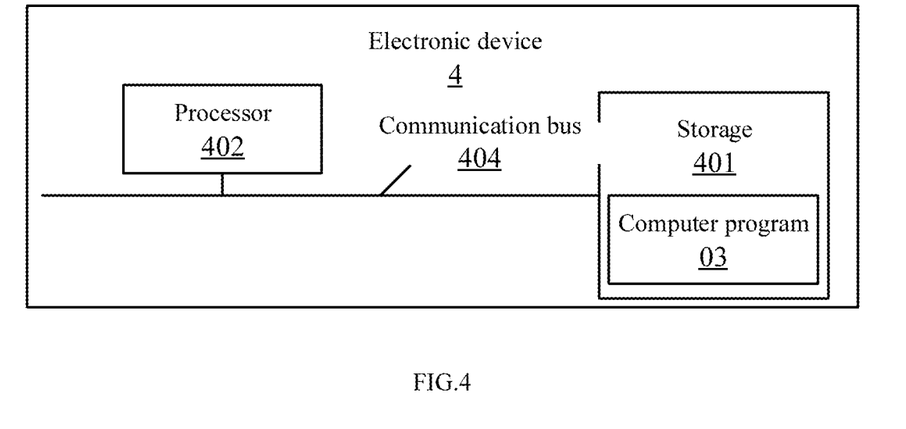
FIG. 4 is a schematic diagram of one embodiment of an electronic device according to the present disclosure.

In one embodiment, the method is applied in a vehicle-mounted electronic device (referring to FIG. 4). The electronic device connects to the vehicle. The electronic device can be any electronic product that can interact with a user, such as a personal computer, a tablet computer, a smart phone, a Personal Digital Assistant (PDA), a game console, an Internet Protocol Television (IPTV), a smart wearable device, etc.

The electronic device is a device that can automatically perform numerical calculation and/or information processing according to pre-set or stored instructions, and its hardware includes, but is not limited to, a microprocessor, an Application Specific Integrated Circuit (ASIC), a Field-Programmable Gate Array (FPGA), a Digital Signal Processor (DSP), an embedded device, etc.

In one embodiment, the electronic device may also include a network device and/or a user device. The network device includes, but is not limited to, a single network server, a server group consisting of multiple network servers, or a cloud server consisting of a large number of hosts or network servers.

A network connected to the electronic device includes, but is not limited to, the Internet, a wide area network, a metropolitan area network, a local area network, a Virtual Private Network (VPN), etc.

The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, when detecting a vehicle is in a driving state or when an engine of a vehicle is running, Red-Green-Blue (RGB) images of a scene in front of the vehicle are obtained.

In one embodiment, detecting whether the vehicle is moving includes: detecting whether a pointer of a tachometer on an instrument panel of the vehicle is on a "0" speed scale; when the pointer of the tachometer points is on the "0" speed scale, it is determined that the vehicle is in a non-driving state; when the pointer of the tachometer is on other speed scales other than "0" speed scale, it is determined that the vehicle is in the driving state. In one embodiment, the driving state of the vehicle is determined by detecting the speed of the vehicle.

In one embodiment, obtaining the RGB images of the scene in front of the vehicle includes: obtaining the RGB images of the scene in front of the vehicle by a camera. For example, the RGB images of the scene in front of the vehicle are captured by the camera mounted on the vehicle.

In one embodiment, when detecting that the vehicle is in the driving state, the camera of the vehicle is activated to capture images of the scene in front of the vehicle, and the RGB images are obtained.

At block 202, the RGB images are processed based on a trained depth estimation model, and obtaining depth images corresponding to the RGB images.

In one embodiment, the depth estimation model includes a depth estimation convolutional neural network and a pose estimation convolutional neural network. In one embodiment, the depth estimation convolutional neural network includes first input layers, first convolutional layers, and deconvolutional layers. The pose estimation convolutional neural network includes second input layers, and second convolutional layers.

In one embodiment, the method includes: training the depth estimation model and obtaining the trained depth estimation model. In one embodiment, training the depth estimation model includes:

obtaining training images; inputting the training images into the depth estimation convolutional neural network, and obtaining the depth images corresponding to the training images; inputting adjacent frames of images of the training images into the pose estimation convolutional neural network, and obtaining the pose information of the camera corresponding to the adjacent frames; reconstructing the training images based on the depth images, the pose information of the camera, and internal parameters of the camera corresponding to the RGB images, and obtaining reconstructed images; calculating loss values between the training images and the reconstructed images by using a preset loss function, adjusting the parameters of the depth estimation model to minimize the loss values, and thereby obtaining the trained depth estimation model.

In one embodiment, the method further includes: performing data augmentation operations on the training images, and obtaining more training images as training samples. In one embodiment, the data augmentation operations include, but are not limited to, flipping the images, rotating the images, scaling the images, cropping the images. By performing the data enhancement operations on the training images, the number of training samples can be expanded, and the depth estimation model can be trained and optimized using more training images in different scenarios, thereby making the depth estimation model more robust.

In one embodiment, inputting the training images into the depth estimation convolutional neural network and obtaining the depth images corresponding to the training images includes:

inputting the training images into the first input layers of the depth estimation convolutional neural network, and performing convolution operations on the training images by the first convolutional layers, and obtaining a feature map of the training images; inputting the feature map into the deconvolution layers of the depth estimation convolutional neural network, and performing deconvolution operations, obtaining a target feature map after deconvolution operations, and mapping each pixel in the target feature map to a corresponding depth value of the each pixel, and obtaining the depth images, and outputting the depth images corresponding to the training images.

In one embodiment, the adjacent frames of one training image includes a previous frame of the training image or a next frame of the training image. For example, the training image is captured at time t, the adjacent frame image at time t is the training image at time (t+1) or the training image at time (t−1), wherein time t, time (t+1), time (t−1) corresponds to different frame images. It should be noted that the training images are the RGB images.

In one embodiment, inputting the adjacent frames of the training images into the pose estimation convolutional neural network and obtaining the pose information of camera corresponding to the adjacent frames includes: inputting the adjacent frames of the training images into the second input layers of the pose estimation convolutional neural network, and performing the convolution operations on the adjacent frames by the second convolutional layers of the pose estimation convolutional neural network, and obtaining the pose information of the camera of the adjacent frames. In one embodiment, the pose information of the camera includes a rotation matrix and a translation matrix, such matrices being represented by six degrees of freedom. In one embodiment, the pixel coordinates in the training images determine the corresponding pixel coordinates in the adjacent frames by the pose information of the camera.

In one embodiment, the method includes: calculating the reconstructed images according to a formula of $P_{t+1} = K\hat{T}_{t \to t+1} \hat{D}(P_t) K^{-1} P_t$, wherein $P_{t+1}$ represents one reconstructed image, K represents the internal parameters of the camera, $\hat{T}_{t \to t+1}$ represents the pose estimation value (pose information) of the adjacent frames, $\hat{D}(P_t)$ represents the depth value of a pixel coordinate $P_t$, and $P_t$ represents the pixel coordinate of the training images. In one embodiment, the internal parameters of the camera can be a parameter matrix, then $K^{-1}$ represents an inverse matrix of the parameter matrix of the internal parameters of the camera.

In one embodiment, the method further includes: calculating the loss values between the training images and the reconstructed images with a preset loss function, adjusting the parameters of the depth estimation model to minimize the loss values, and obtaining the trained depth estimation model.

In one embodiment, the preset loss function is calculated according to $$L = \frac{1}{M} \sum_t \left( \frac{1}{N} \sum_p |I_t(p) - I_{t+1}(p)|^2 \right),$$

wherein $I_t(p)$ represents the pixel coordinates of the training images, $I_{t+1}(p)$ represents the pixel coordinates of the reconstructed images, N represents a number of pixel coordinates, and M represents a number of the training images.

In one embodiment, the parameters of the depth estimation model refer to the initialization configuration parameters of the depth estimation convolutional neural network and the pose estimation convolutional neural network. For example, the parameters of the depth estimation model include the number of layers of the first convolutional layers and the number of the deconvolutional layers in the depth estimation convolutional neural network, and a size of convolutional kernels of the first convolutional layers and a size of convolutional kernels of the deconvolutional layers. In one embodiment, the parameters of the depth estimation model further include the number of layers of the second convolutional layers in the pose estimation convolutional neural network and the size of a convolutional kernels in the second convolutional layers.

In one embodiment, after the training of the depth estimation model and a trained depth estimation model is obtained, the RGB images are input into the trained depth estimation model, and the depth images corresponding to the RGB images are output.

At block 203, the depth images are converted to 3D point cloud maps.

In one embodiment, converting the depth images to 3D point cloud maps includes: converting the depth images into the 3D point cloud maps based on the internal parameters of the camera and the depth images.

In one embodiment, the method includes: converting the depth images to the 3D point cloud maps according to a formula of $$D\begin{bmatrix}a_1\\b_1\\1\end{bmatrix}=KU=\begin{bmatrix}f_x&0&c_x\\0&f_y&c_y\\0&0&1\end{bmatrix}\begin{bmatrix}a\\b\\c\end{bmatrix},$$

wherein D represents a depth value of one depth image, ($a_1$, $b_1$) represents a pixel coordinate corresponding to the depth value in the depth image, K represents the internal parameters of the camera, and U represents a coordinate (a, b, c) of a point in the 3D point cloud maps.

At block 204, 3D regions of interest is determined from the 3D point cloud maps according to a size of the vehicle.

In one embodiment, determining the 3D regions of interest from the 3D point cloud maps based on the size of the vehicle includes: obtaining a length, a width, and a height of the vehicle; determining the 3D regions of interest from the 3D point cloud maps according to the length, the width and the height of the vehicle.

At block 205, the 3D regions of interest are converted into 2D regions of interest.

In one embodiment, converting the 3D regions of interest into the 2D regions of interest includes: converting the 3D regions of interest into the 2D regions of interest according to a formula of $$z\begin{bmatrix}x_1\\y_1\\1\end{bmatrix}=KB=\begin{bmatrix}f_x&0&c_x\\0&f_y&c_y\\0&0&1\end{bmatrix}\begin{bmatrix}x\\y\\z\end{bmatrix},$$

wherein (x1, y1) represents a coordinate of one 2D region of interest, K represents the internal parameters of the camera, and B represents a coordinate (x, y, z) of one 3D region of interest.

At block 206, the 2D regions of interest are determined whether have obstacles.

In one embodiment, determining whether the 2D regions of interests have obstacles includes: determining whether the 2D regions of interest have obstacles by an advanced driving assistance system, and obtaining a determining result, controlling the vehicle to continue driving or issue an alarm according to the determining result by the advanced driving assistance system. In one embodiment, when the determining result indicates that the 2D regions of interest have no obstacles, block 207 is executed, when the determining result indicates that the 2D regions of interest have obstacles, block 208 is executed.

At block 207, the vehicle is controlled to continue driving.

At block 208, the vehicle is controlled to issue an alarm.

In one embodiment, when the determining result indicates that the 2D regions of interest have obstacles, the vehicle is controlled to issue a collision warning or perform an automatic braking.

In one embodiment, the conversion of the 3D regions of interest into the 2D regions of interest allows a direct and convenient determination to be made as to whether there is an obstacle in the 2D regions of interest in the RGB images, reducing the time spent on determining whether there are obstacles ahead during a driving process, and improving the driving safety and the driver's driving experience.

Figure 3:
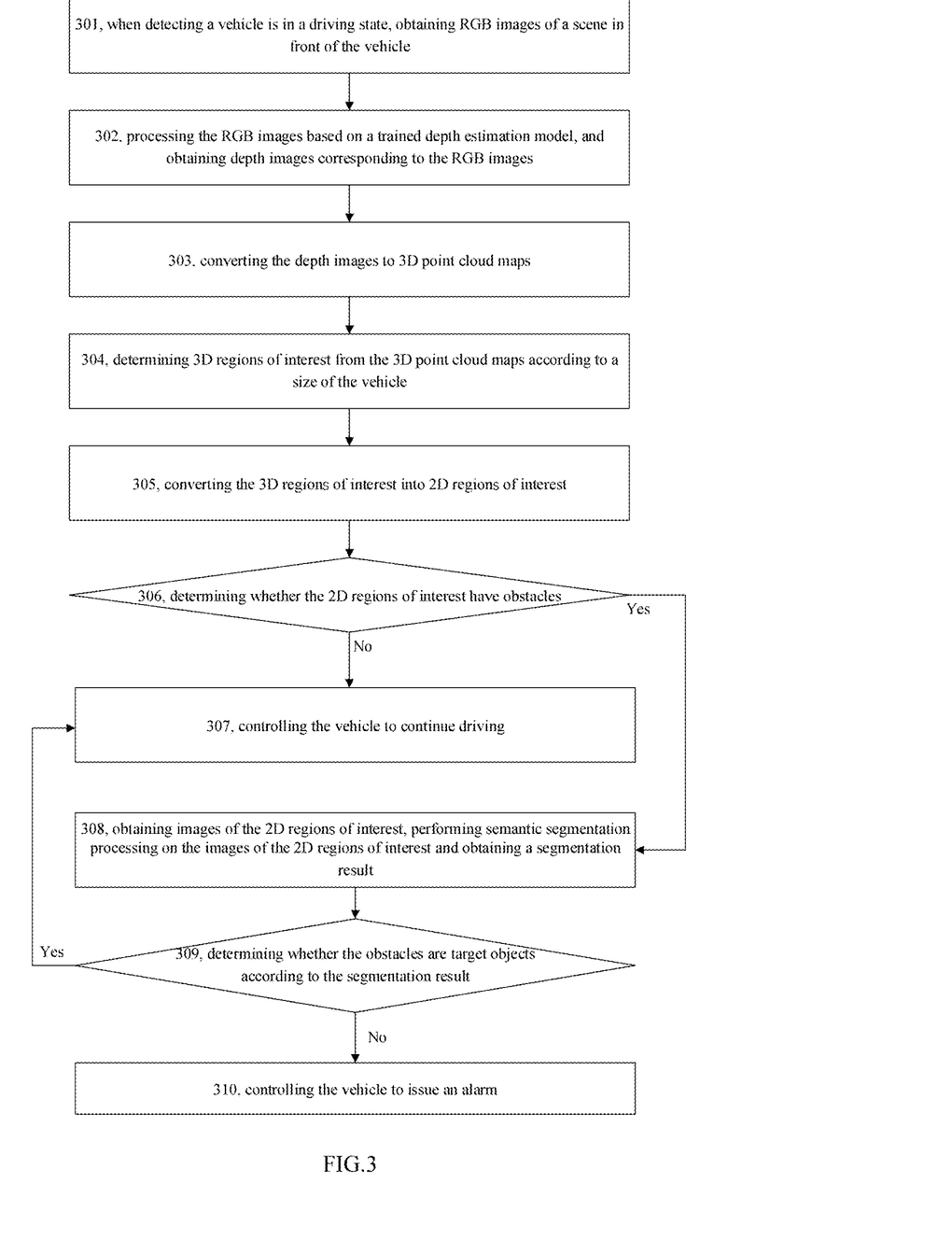
FIG. 3 is a flowchart of another embodiment of a method for managing driving of FIG. 1.

FIG. 3 illustrates another embodiment of the method for managing driving. The method can begin at block 301.

It should be noted that blocks 301-305 are similar to the blocks 201 to 205, which are not repeated in this embodiment.

At block 306, the 2D regions of interest are determined whether have obstacles.

In one embodiment, determining whether the 2D regions of interests have obstacles includes: determining whether the 2D regions of interest have obstacles by the advanced driving assistance system, and obtaining a determining result, controlling the vehicle to continue driving or issue the alarm according to the determining result by the advanced driving assistance system. In one embodiment, when the determining result indicates that the 2D regions of interest have no obstacles, block 307 is executed, when the determining result indicates that the 2D regions of interest have obstacles, block 308 is executed.

At block 307, the vehicle is controlled to continue driving.

At block 308, images of the 2D regions of interest are obtained, semantic segmentation processing is performed on the images of the 2D regions of interest and a segmentation result is obtained.

In one embodiment, performing semantic segmentation processing on the images of the 2D regions of interest and obtaining a segmentation result includes: inputting the images of the 2D regions of interest into a pre-trained semantic segmentation model, and obtaining categories of objects of the obstacles in the 2D regions of interest, wherein the pre-trained semantic segmentation is a semantic segmentation model constructed based on a Fully Convolutional Network (FCN). In one embodiment, the FCN network can be a network deformation that converts the fully connected layers of an existing Visual Geometry Group-16 (VGG-16) network or a Convolutional Neural Network (CNN) into convolutional layers. In one embodiment, the FCN network can be obtained by converting the last three fully connected layers of the VGG-16 network or the CNN network into three convolutional layers. The FCN network can accept input images of any size.

In one embodiment, the method further includes: training a semantic segmentation model and obtaining the pre-trained semantic segmentation model.

In one embodiment, training the semantic segmentation model and obtaining the pre-trained semantic segmentation model includes: obtaining training images; inputting the training images into the semantic segmentation model, and performing convolution operations on the training images by using the convolutional layers of the semantic segmentation model, and performing pooling operations on the training images by using the pooling layers of the semantic segmentation model, and obtaining feature maps of different sizes; performing upsampling operations on the feature maps of different sizes to restore the feature maps of different sizes to the same size as the training images; classifying each pixel of the feature maps having same size as the input training image, and calculating a value of loss of each pixel by using a softmax function pixel by pixel; adjusting parameters of the semantic segmentation model to minimize the loss value, obtaining a trained semantic segmentation model, and taking the trained semantic segmentation model as the pre-trained semantic segmentation model.

In one embodiment, the softmax function is able to compress or map a K-dimensional arbitrary real vector into another K-dimensional real vector, and each element of the K-dimensional real vector has a value between 0 and 1. The softmax function can be used in the last layer of the semantic segmentation model, and the last layer of the semantic segmentation model is used as an output layer to classify each pixel, and a segmentation result of the training images can be obtained by the output layer.

In one embodiment of the above method, a training process of the semantic segmentation model can be completed, and a trained semantic segmentation model can be obtained, and the trained semantic segmentation model can be used as the pre-trained semantic segmentation model. Therefore, the 2D regions of interest images are input into the pre-trained semantic segmentation model, and the segmentation result of the 2D regions of interest is output. In one embodiment, the segmentation result of the 2D regions of interest includes the object categories of the obstacles in the 2D regions of interest.

At block 309, determining whether the obstacles are target objects according to the segmentation result.

In one embodiment, the target objects include a background of a sky and/or a background of a road.

In one embodiment, when the segmentation result indicates that the obstacles belong to the background of the sky and/or the background of the road, block 307 is executed, when the segmentation result indicates that the obstacles do not belong to the background of the sky and/or the background of the road, block 310 is executed.

At block 310, the vehicle is controlled to issue an alarm.

By performing semantic segmentation on the 2D regions of interest, it can be determined whether the obstacles belong to the background of the sky and/or to the background of the road. If the obstacles belong to the background of the sky and/or the background of the road, no alarms will be issued, thereby reducing interference arising from the background of the sky and/or the background of the road in the 2D regions of interest, improving the driving safety and driving experience.

The above embodiments are only specific embodiments of the present application, but a protection scope of the present application is not limited to these. For those of ordinary skill in the art, improvements can be made without departing from the inventive concept of the present application, but these all belong to the protection scope of the present application.

FIG. 4 illustrates the electronic device 4. The electronic device 4 includes a storage 401, a processor 402, a computer program 403 stored in the storage 401, and at least one communication bus 404. In one embodiment, electronic device 4 can be an in-vehicle device. The in-vehicle device is provided on a vehicle, and the in-vehicle device may be an in-vehicle computer.

Those skilled in the art can understand that the schematic diagram shown in FIG. 4 is only an example of the electronic device 4, and does not constitute a limitation on the electronic device 4. Other examples may include more or less components than those shown in the drawings, or have different combinations of components, or different components, for example, the electronic device 4 may also include input and output devices, network access devices, and the like.

The at least one processor 402 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The at least one processor 402 can be a microprocessor or the at least one processor 402 can also be any conventional processor, etc. The at least one processor 402 is the control center of the electronic device 4, using various interfaces and lines to connect various parts of the entire electronic device 4.

The storage 401 can be used to store the computer program 403, and the at least one processor 402 implements the electronic program by executing the computer program 403 stored in the storage 401 and calling up data stored in the storage 401. The storage 401 may include a stored program area and a stored data area, wherein the stored program area may store an operating system, an application program required for at least one function (such as a sound playback function, an image playback function, etc.), etc. The storage data area may store data (such as audio data) created according to the use of the electronic device 4, etc. In addition, the storage 401 may include non-volatile storage such as a hard disk, an internal memory, a plug-in hard disk, a Smart Media Card (SMC), a Secure Digital (SD) card, a Flash Card (Flash Card), at least one disk storage device, flash memory device, or other non-volatile solid state storage device.

In one embodiment, the modules/units integrated in the electronic device 4 can be stored in a computer readable storage medium if such modules/units are implemented in the form of an independent product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM).

The exemplary embodiments shown and described above are only examples. Even though numerous characteristics and advantages of the present disclosure have been set forth in the foregoing description, together with details of the structure and function of the present disclosure, the disclosure is illustrative only and changes may be made in the detail, including in matters of shape, size, and arrangement of the parts within the principles of the present disclosure, up to and including the full extent established by the broad general meaning of the terms used in the claims.

What is claimed is:

1. A method for managing driving comprising:
   when detecting a vehicle is in a driving state, obtaining Red-Green-Blue (RGB) images of a scene in front of the vehicle;
   processing the RGB images based on a trained depth estimation model, and obtaining depth images corresponding to the RGB images;
   converting the depth images to three dimensional (3D) point cloud maps;
   determining 3D regions of interest of the vehicle from the 3D point cloud maps according to a size of the vehicle;
   converting the 3D regions of interest into 2D regions of interest according to internal parameters of a camera, comprising: obtaining a size of the vehicle, the size comprising a length, a width and a height of the vehicle; determining the 3D regions of interest of the vehicle from the 3D point cloud maps according to the length, the width and the height of the vehicle;
   determining whether the 2D regions of interest have obstacles;
   in response that the 2D regions of interest have no obstacles, controlling the vehicle to continue driving;
   in response that the 2D regions of interest have the obstacles, controlling the vehicle to issue an alarm.

2. The method as claimed in claim 1, further comprising:
   converting the 3D regions of interest into the 2D regions of interest according to a formula of $$z \begin{bmatrix} x_1 \\ y_1 \\ 1 \end{bmatrix} = KB = \begin{bmatrix} f_x & 0 & c_x \\ 0 & f_y & c_y \\ 0 & 0 & 1 \end{bmatrix} \begin{bmatrix} x \\ y \\ z \end{bmatrix},$$

in which (x1, y1) represents a coordinate of one 2D region of interest, K represents the internal parameters of the camera, B represents a coordinate (x, y, z) of one 3D region of interest.

3. The method as claimed in claim 1, wherein the depth estimation model comprises a depth estimation convolutional neural network and a pose estimation convolutional neural network.

4. The method as claimed in claim 3, further comprising:
   training the depth estimation model, and obtaining the trained depth estimation model.

5. The method as claimed in claim 4, further comprising:
   obtaining training images;
   inputting the training images into the depth estimation convolutional neural network, and obtaining the depth images corresponding to the training images;
   inputting adjacent frames of the training images into the pose estimation convolutional neural network, and obtaining a pose information of a camera corresponding to the adjacent frames;
   reconstructing the training images based on the depth images, the pose information of the camera, and internal parameters of the camera corresponding to the RGB images, and obtaining reconstructed images;
   calculating loss values between the training images and the reconstructed images by using a preset loss function;
   adjusting parameters of the depth estimation model to minimize the loss values, and obtaining the trained depth estimation model.

6. The method as claimed in claim 5, further comprising:
   calculating the reconstructed images according to a second formula of $P_{t+1} = K\hat{T}_{t \to t+1} \hat{D}(P_t) K^{-1} P_t$, in which $P_{t+1}$ represents one reconstructed image, K represents the internal parameters of the camera, $\hat{T}_{t \to t+1}$ represents the pose information of the adjacent frames, $\hat{D}(P_t)$ represents the depth value of a pixel coordinate, $P_t$ represents the pixel coordinate of the training images.

7. The method as claimed in claim 1, further comprising:
   converting the depth images to the 3D point cloud maps according to a formula of $$D \begin{bmatrix} a_1 \\ b_1 \\ 1 \end{bmatrix} = KU = \begin{bmatrix} f_x & 0 & c_x \\ 0 & f_y & c_y \\ 0 & 0 & 1 \end{bmatrix} \begin{bmatrix} a \\ b \\ c \end{bmatrix},$$

in which D represents a depth value of one depth image, (a1, b1) represents a pixel coordinate corresponding to the depth value in the depth image, K represents the internal parameters of the camera, and U represents a coordinate (a, b, c) of a point in the 3D point cloud maps.

8. A method for managing driving comprising:
   in response that a vehicle is in a driving state is detected, obtaining Red-Green-Blue (RGB) images of a scene in front of the vehicle;
   processing the RGB images based on a trained depth estimation model, and obtaining depth images corresponding to the RGB images;
   converting the depth images to three dimensional (3D) point cloud maps;
   determining 3D regions of interest of the vehicle from the 3D point cloud maps according to a size of the vehicle;
   converting the 3D regions of interest into two dimensional (2D) regions of interest according to internal parameters of a camera;
   determining whether the 2D regions of interest have obstacles;
   in response that the 2D regions of interest have obstacles, obtaining images of the 2D regions of interest, performing semantic segmentation processing on the images of the 2D regions of interest and obtaining a segmentation result, wherein the segmentation result includes object categories of the obstacles in the 2D regions of interest;
   determining whether the obstacles are target objects according to the segmentation result;
   in response that the segmentation result indicates that the obstacles are the target objects, controlling the vehicle to continue driving;
   in response that the segmentation result indicates that the obstacles are not the target objects, controlling the vehicle to issue an alarm.

9. The method as claimed in claim 8, further comprising:
   in response that the 2D regions of interest have no obstacles, controlling the vehicle to continue driving.

10. The method as claimed in claim 8, further comprising:
    inputting the images of the 2D regions of interest into a pre-trained semantic segmentation model, and obtaining the object categories of the obstacles in the 2D regions of interest, wherein the pre-trained semantic segmentation is a semantic segmentation model constructed based on a Fully Convolutional Network.

11. The method as claimed in claim 8, wherein the target objects include a background of a sky or a background of a road.

12. An electronic device comprising:
a processor; and
a non-transitory storage medium coupled to the processor and configured to store a plurality of instructions, which cause the processor to:
  in response that detecting a vehicle is in a driving state, obtain Red-Green-Blue (RGB) images of a scene in front of the vehicle;
  process the RGB images based on a trained depth estimation model, and obtain depth images corresponding to the RGB images;
  convert the depth images to three dimensional (3D) point cloud maps;
  determine 3D regions of interest of the vehicle from the 3D point cloud maps according to a size of the vehicle;
  convert the 3D regions of interest into two dimensional (2D) regions of interest according to internal parameters of a camera, comprising: obtaining a size of the vehicle, the size comprising a length, a width and a height of the vehicle; determining the 3D regions of interest of the vehicle from the 3D point cloud maps according to the length, the width and the height of the vehicle;
  determine whether the 2D regions of interest have obstacles;
  in response that the 2D regions of interest have no obstacles, control the vehicle to continue driving;
  in response that the 2D regions of interest have the obstacles, control the vehicle to issue an alarm.

13. The electronic device as claimed in claim 12, wherein the plurality of instructions are further configured to cause the processor to:
convert the 3D regions of interest into the 2D regions of interest according to a formula of $$z\begin{bmatrix} x_1 \\ y_1 \\ 1 \end{bmatrix} = KB = \begin{bmatrix} f_x & 0 & c_x \\ 0 & f_y & c_y \\ 0 & 0 & 1 \end{bmatrix} \begin{bmatrix} x \\ y \\ z \end{bmatrix},$$

in which (x1, y1) represents a coordinate of one 2D region of interest, K represents the internal parameters of the camera, B represents a coordinate (x, y, z) of one 3D region of interest.

14. The electronic device as claimed in claim 12, wherein the depth estimation model comprises a depth estimation convolutional neural network and a pose estimation convolutional neural network.

15. The electronic device as claimed in claim 14, wherein the plurality of instructions are further configured to cause the processor to:
train the depth estimation model, and obtain the trained depth estimation model.

16. The electronic device as claimed in claim 15, wherein the plurality of instructions are further configured to cause the processor to:
obtain training images;
input the training images into the depth estimation convolutional neural network, and obtain the depth images corresponding to the training images;
input adjacent frames of the training images into the pose estimation convolutional neural network, and obtain a pose information of a camera corresponding to the adjacent frames;
reconstruct the training images based on the depth images, the pose information of the camera, and internal parameters of the camera corresponding to the RGB images, and obtain reconstructed images;
calculate loss values between the training images and the reconstructed images by using a preset loss function;
adjust parameters of the depth estimation model to minimize the loss values, and obtain the trained depth estimation model.

17. The electronic device as claimed in claim 16, wherein the plurality of instructions are further configured to cause the processor to:
calculate the reconstructed images according to a second formula of $P_{t+1} = K\hat{T}_{t \to t+1} \hat{D}(P_t) K^{-1} P_t$, in which $P_{t+1}$ represents one reconstructed image, K represents the internal parameters of the camera, $\hat{T}_{t \to t+1}$ represents the pose information of the adjacent frames, $\hat{D}(P_t)$ represents the depth value of a pixel coordinate, $P_t$ represents the pixel coordinate of the training images.

18. The electronic device as claimed in claim 12, wherein the plurality of instructions are further configured to cause the processor to:
convert the depth images to the 3D point cloud maps according to a formula of $$D\begin{bmatrix} a_1 \\ b_1 \\ 1 \end{bmatrix} = KU = \begin{bmatrix} f_x & 0 & c_x \\ 0 & f_y & c_y \\ 0 & 0 & 1 \end{bmatrix} \begin{bmatrix} a \\ b \\ c \end{bmatrix},$$

in which D represents a depth value of one depth image, (a1, b1), represents a pixel coordinate corresponding to the depth value in the depth image, K represents the internal parameters of the camera, and U represents a coordinate (a, b, c) of a point in the 3D point cloud maps.

* * * * *